(12) United States Patent
Hosoya et al.

(10) Patent No.: US 9,358,875 B2
(45) Date of Patent: Jun. 7, 2016

(54) RADIATOR SHROUD STRUCTURE FOR SADDLE RIDING TYPE VEHICLE

(71) Applicant: HONDA MOTOR CO., LTD., Minato-Ku, Tokyo (JP)

(72) Inventors: Kyohei Hosoya, Wako (JP); Tomoya Matsuo, Wako (JP); Kohei Hirano, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/666,514

(22) Filed: Mar. 24, 2015

(65) Prior Publication Data

US 2015/0274001 A1 Oct. 1, 2015

(30) Foreign Application Priority Data

Mar. 28, 2014 (JP) ................................ 2014-067898

(51) Int. Cl.
| | |
|---|---|
| *B60K 11/04* | (2006.01) |
| *B62J 17/02* | (2006.01) |
| *B62J 23/00* | (2006.01) |
| *B62K 11/04* | (2006.01) |
| *B62J 17/00* | (2006.01) |
| *B62J 35/00* | (2006.01) |

(52) U.S. Cl.
CPC ................ B60K 11/04 (2013.01); B62J 17/00 (2013.01); B62J 17/02 (2013.01); B62J 23/00 (2013.01); B62J 35/00 (2013.01); B62K 11/04 (2013.01)

(58) Field of Classification Search
CPC .......... B60K 11/04; B62J 17/00; B62J 17/02; B62J 23/00; B62J 35/00; B62K 11/04; B62K 19/48
See application file for complete search history.

(56) References Cited

U.S. PATENT DOCUMENTS

| | | | | | |
|---|---|---|---|---|---|
| 5,984,035 | A * | 11/1999 | Katoh | ................... | B62K 11/04 180/229 |
| 7,537,077 | B2 * | 5/2009 | Nakashima | .............. | B62J 17/00 180/229 |
| 8,770,330 | B2 * | 7/2014 | Inoue | ...................... | B62J 23/00 180/218 |
| 8,783,399 | B2 * | 7/2014 | Maeda | ..................... | B62J 23/00 180/68.1 |
| 8,905,169 | B2 * | 12/2014 | Yama | ....................... | B62J 35/00 180/68.1 |
| 2006/0175112 | A1 * | 8/2006 | Yoshida | ................... | B62J 35/00 180/229 |
| 2007/0107967 | A1 * | 5/2007 | Satake | .................... | B62J 17/02 180/218 |
| 2013/0026784 | A1 * | 1/2013 | Maeda | .................... | B62J 17/02 296/181.1 |

FOREIGN PATENT DOCUMENTS

JP 03-193585 A 8/1991

* cited by examiner

*Primary Examiner* — John Walters
*Assistant Examiner* — Brian Swenson
(74) *Attorney, Agent, or Firm* — Carrier Blackman & Associates, P.C.; Joseph P. Carrier; Anne G. Sabourin

(57) ABSTRACT

A saddle riding type vehicle, includes a frame including a head pipe and a pair of left and right main frames extending rearward and downward from the head pip, a fuel tank supported between the left and right main frames, a radiator; and a radiator shroud structure. The shroud structure includes shrouds covering lateral sides of the radiator and shroud fastening portions fixed to outer side walls of the left and right main frames so that upper portions of the shrouds are arranged in covering relation along outer faces of the outer side walls of the main frames, and lower portions of the shrouds extend downward from the upper portions of the shrouds and are connected to the radiator.

16 Claims, 5 Drawing Sheets

RADIATOR SHROUD STRUCTURE FOR SADDLE RIDING TYPE VEHICLE

CROSS-REFERENCE TO RELATED APPLICATIONS

The present invention claims priority under 35 USC 119 based on Japanese patent application No. 2014-067898, filed on Mar. 28, 2014. The entire subject matter of this priority document, including specification claims and drawings thereof, is incorporated by reference herein.

BACKGROUND OF THE INVENTION

1. Field of the Invention

The present invention relates to a radiator shroud structure for a saddle riding type vehicle, and particularly to such a radiator shroud structure which is connected to main frames of a vehicle body frame of the saddle riding type vehicle and covers lateral sides of a radiator of the saddle riding type vehicle.

2. Background Art

A radiator shroud structure for a saddle riding type vehicle disclosed in Japanese Patent Application Publication No. Hei 03-193585 has conventionally been known which includes: a vehicle-body frame having a head pipe and a pair of left and right main frames extending rearward from the head pipe, the vehicle-body frame supporting a fuel tank between the left and right main frames and supporting a radiator below the left and right main frames; and radiator shrouds covering lateral sides of the radiator.

In the above-described conventional radiator shroud structure, upper portions of the radiator shrouds are attached to attachment bosses welded to lower portions of the main frames. For this reason, the main frames are exposed at the lateral sides of the vehicle, and outer faces of the main frames are not protected by the shrouds.

SUMMARY OF THE INVENTION

In view of such drawbacks of the conventional radiator shroud structure of the saddle riding type vehicle, an object of the present invention is to provide a radiator shroud structure capable of also protecting outer faces of main frames of the vehicle's body frame.

For the purpose of solving the above-mentioned object, according to a first aspect of the present invention there is provided a radiator shroud structure for a saddle riding type vehicle having a vehicle-body frame including a head pipe and a pair of left and right main frames extending rearward and downward from the head pipe, a fuel tank supported by the vehicle-body frame between the left and right main frames, and a radiator supported below the left and right main frames, wherein the shroud structure comprises:

radiator shrouds covering lateral sides of the radiator; and shroud fastening portions provided on outer side walls of the pair of left and right main frames, wherein the shrouds are fastened and fixed to the respective shroud fastening portions provided on the outer side walls of the main frames, and upper portions of the shrouds are respectively arranged in covering relation along outer faces of the outer side walls of the main frames, and lower portions of the shrouds extend downward from the upper portions of the shrouds and are configured to be coupled to the radiator.

With this radiator shroud structure according to the first aspect of the present invention, since the shrouds are fixedly fastened to the shroud fastening portions provided on the outer side walls of the pair of right and left main frames and the upper portions of the shrouds are arranged along outer faces of the outer side walls of the main frames, it is possible to protect the outer faces of the outer side walls of the main frames by using the upper portions of the shrouds.

Moreover, since the lower portions of the shrouds extend downward from the upper portions and are configured to be coupled to the radiator, and the upper portions of the shrouds are arranged along the outer side walls of the respective main frames, when stress is applied to either of the shrouds, the upper portion of the stressed shroud abuts on the outer face of the outer side wall of the corresponding main frame and is restricted in position by the outer side wall. For this reason, it is possible to favorably suppress the deformation of the shroud when stress is applied thereto.

According to a second aspect of the present invention, the saddle riding type vehicle further includes a tank cover covering the fuel tank from above, and lower sides of the tank cover are arranged along upper sides of the respective main frames in a side view, and wherein each of the shrouds is configured such that the upper portion of the shroud is arranged along a corresponding lower side of the tank cover so as to be flush therewith.

With this configuration according to the second aspect of the present invention, it is not only possible to favorably protect the outer face of the outer side wall of the main frame by using the upper portion of the shroud, but because the upper portion of the shroud and the lower side of the tank cover are flush with each other, it is also possible for the rider to favorably move his/her legs without being caught or otherwise hindered by any gap between the shroud and the tank cover.

Furthermore, since the upper portions of the shrouds are restricted in position by their connections to the main frames and by their flush positioning relative to the lower ends of the tank cover, it is possible for each of the shrouds to receive the stress of a bump or impact with a wide area of the shroud, and to thus disperse the stress for thereby limiting deformation of the shroud.

According to a third aspect of the present invention, in the saddle riding type vehicle the tank cover and the fuel tank fastened and fixed to the vehicle-body frame by being fastened together from above, and wherein the shrouds are not connected to fuel tank or the tank cover.

With this configuration according to the third aspect of the present invention, it is possible to fasten and remove the tank cover and the fuel tank separately apart from the shrouds, and to achieve a favorable maintainability because the work of removing the fuel tank can be conducted from above.

According to a fourth aspect of the present invention, the radiator shroud structure may be configured such that the shroud fastening portions respectively provided on the main frames each includes a front fastening portion and a rear fastening portion which are provided on front and rear portions of the corresponding main frame, respectively, the upper portion of each of the shrouds includes front and rear portions which are respectively fastened to the front fastening portion and the rear fastening portion provided on the corresponding main frame, and the lower portions of the shrouds are configured to be connected to the radiator such that they support the radiator.

With this configuration according to the fourth aspect of the present invention, it is possible to support the radiator by using the shrouds, and it is possible for each of the shrouds to receive the stress of a bump or impact with an even wider area of the shroud, and to thus effectively disperse the stress for thereby limiting deformation of the shroud.

According to a fifth aspect of the present invention, the radiator shroud structure may be configured such that the front and rear upper portions of each of the shrouds are fastened to the front fastening portion and the rear fastening portion of the corresponding main frame from a lateral side of a vehicle body, and the lower portion of each of the shrouds is also connected to the radiator from a lateral side of a vehicle body.

With this configuration according to the fifth aspect of the present invention, it is possible to achieve a favorable workability for removing the shrouds, and to thus achieve a favorable maintainability.

According to a sixth aspect of the present invention, the radiator shroud structure may be configured such that each of the shrouds includes an open notch located between the front and rear upper portions thereof, and the notch is also located rearward of the radiator when the shroud is connected to the saddle riding type vehicle.

With this configuration according to the sixth aspect of the present invention, since the front fastening portion and the rear fastening portion as provided on the corresponding main frame, which extends rearwardly and downwardly from the head pipe, are not connected in a straight line extending either longitudinally or vertically of the vehicle, it is possible to achieve a shape with which force acting on one of the front and rear upper portions of one of the shrouds is unlikely to affect the other upper portion of the shroud. Additionally, because the open notch is located rearwardly of the radiator on the vehicle, it is likely to cause a favorable flow of air to the outside of the vehicle at a position rearward of the radiator and to thus achieve a favorable cooling efficiency of the radiator.

Intent of Disclosure

Although the following disclosure offered for public dissemination is detailed to ensure adequacy and aid in understanding of the invention, this is not intended to prejudice that purpose of a patent which is to cover each new inventive concept therein no matter how it may later be disguised by variations in form or additions of further improvements. The claims at the end hereof are the chief aid toward this purpose, as it is these that meet the requirement of pointing out the improvements, combinations and methods in which the inventive concepts are found. There has been chosen a specific exemplary embodiment of a step structure according to the present invention and specific alternative structures and modifications thereto, the embodiment chosen for the purposes of illustration and description of the structure and method of the invention is shown in the accompanying drawings forming a part of the specification.

BRIEF DESCRIPTION OF THE DRAWINGS

FIGS. 2A and 2B are enlarged side views of portions of FIG. 1, in which FIG. 2A is an enlarged view of a main portion of FIG. 1 including a shroud forming part of the exemplary embodiment of the radiator shroud structure, and FIG. 2B is a side view of the shroud of FIG. 2A by itself.

DETAILED DESCRIPTION OF MODE FOR CARRYING OUT THE INVENTION

Figure 1:
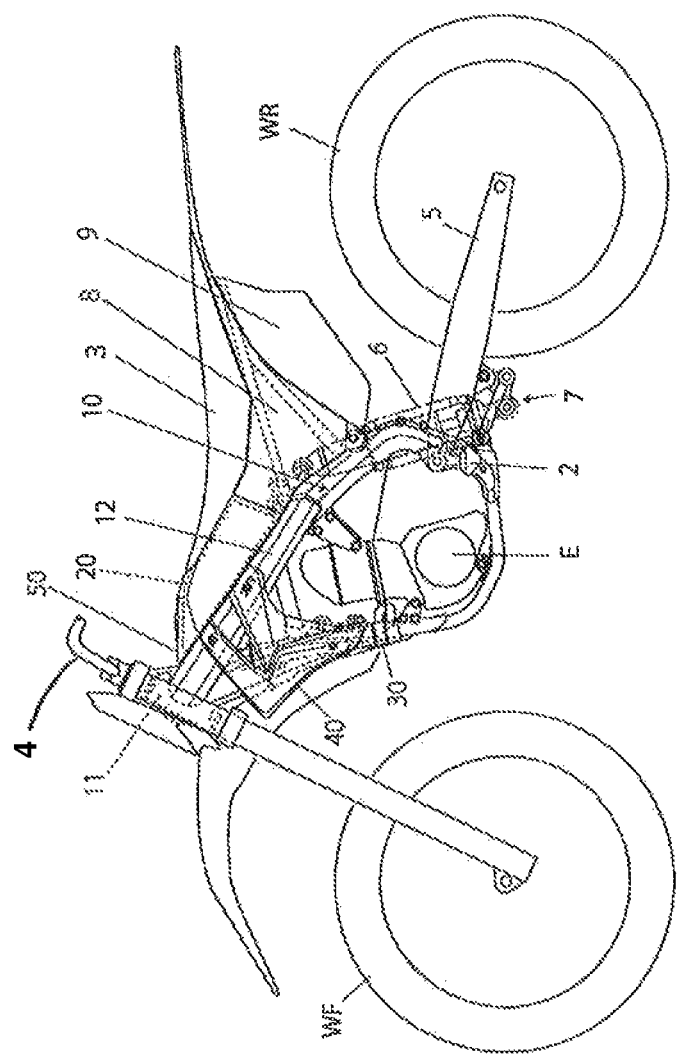
FIG. 1 is a side view illustrating a motorcycle which is an example of a saddle-ride type vehicle to which one of a radiator shroud structure according to the present invention is applied.

Hereinafter, an exemplary embodiment of a radiator shroud structure for a saddle riding type vehicle according to the present invention will be described with reference to the drawings. Note that in the drawings, the same or corresponding portions are denoted by the same reference numerals.

Figure 2A:
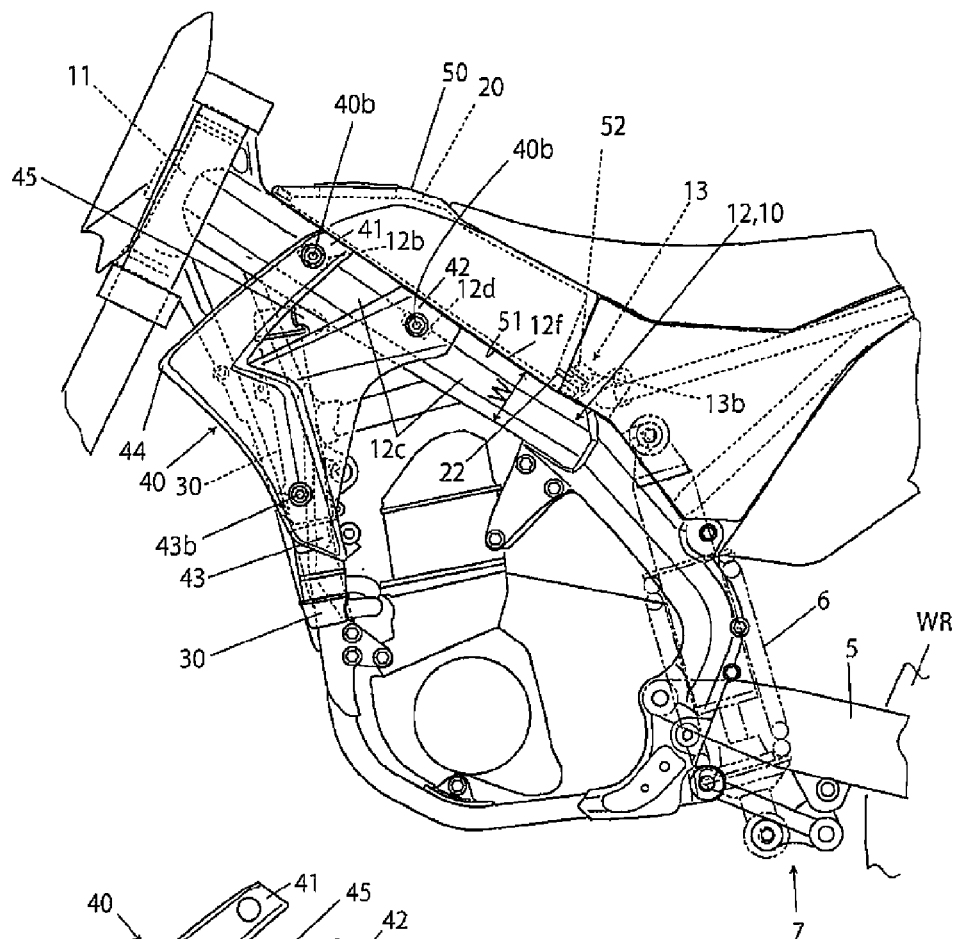
Figure 2B:
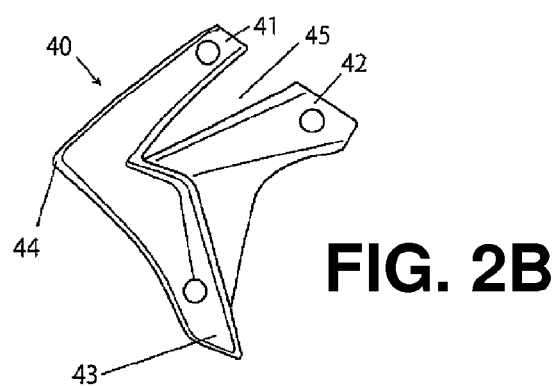
Figure 3:
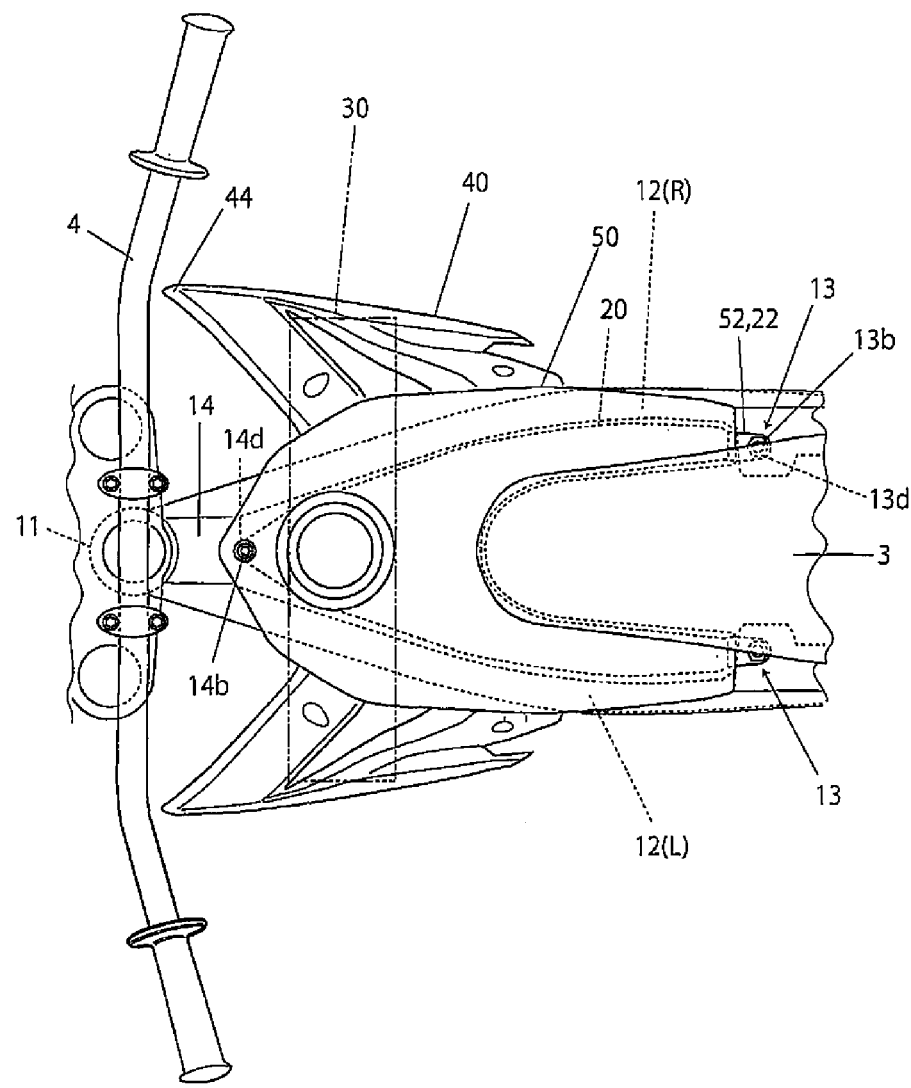
FIG. 3 is an enlarged, partial plan view of the main portion of FIG. 1.

A motorcycle illustrated in FIGS. 1 to 3, as one kind of saddle riding type vehicle, includes: a vehicle-body frame 10 having a head pipe 11 and a pair of left and right main frames 12 (L, R) extending rearward and downward from the head pipe 11 (see FIG. 3), the vehicle-body frame 10 supporting a fuel tank 20 between the left and right main frames 12 and supporting a radiator 30 below the left and right main frames 12; and radiator shrouds (sometimes called simply as shrouds) 40 covering lateral sides of the radiator 30 and which function together with the main frames for supporting the radiator. The depicted motorcycle is an off-road style of motorcycle.

Figure 4:
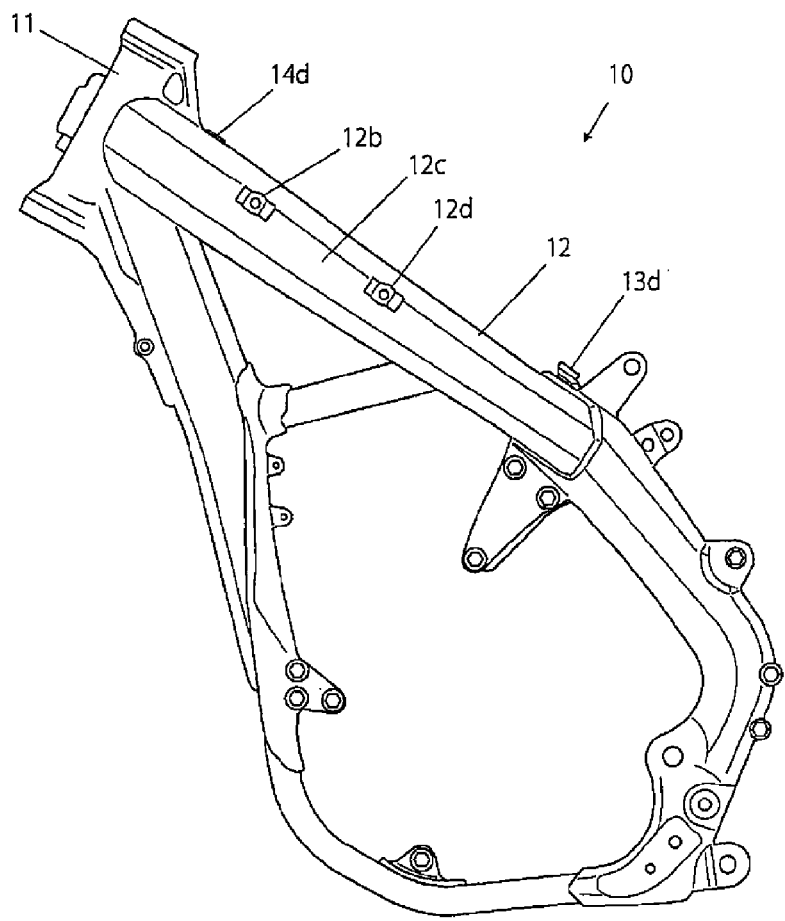
FIG. 4 is an enlarged side view of the frame of the vehicle in FIG. 1.
Figure 5:
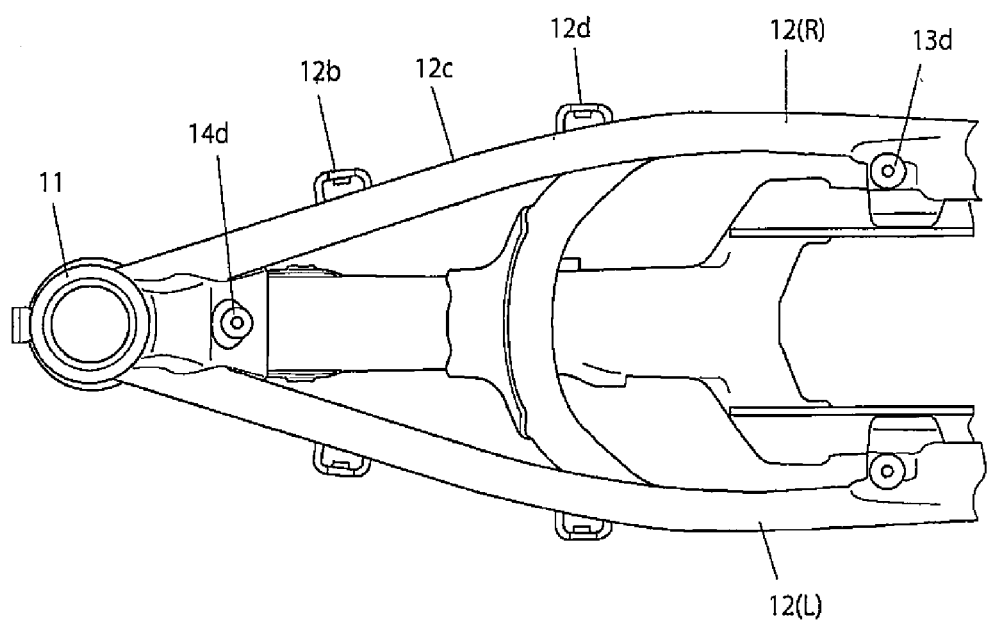
FIG. 5 is an enlarged plan view of part of the frame in FIG. 1.

Each of the shrouds 40 is fastened and fixed to shroud fastening portions 12b, 12d (see FIGS. 4 and 5), which are provided on an outer side wall 12c of the main frame 12, by using fastening members 40b (e.g., bolts are illustrated in the drawings). Upper portions 41, 42 of each of the shrouds 40 are arranged along the face of the outer side wall 12c of the main frame 12, and a lower portion 43 of each of the shrouds 40 extends downward from the upper portions 41, 42 and is coupled to the radiator 30. Any structure as appropriate may be employed for coupling the lower portion 43 of the shroud 40 and the radiator 30. In the drawings, the lower portion 43 of the shroud 40 and the radiator 30 are fastened and fixed by using a bolt 43b.

With such radiator shroud structure, since each of the shrouds 40 is fastened and fixed to the shroud fastening portions 12b, 12d (see FIGS. 4 and 5), which are provided on the outer side wall 12c of the main frame 12, and the upper portions 41, 42 of the shroud 40 are arranged along the face of outer side wall 12c of the main frame 12, it is possible to protect the outer side wall face of the main frame 12 using the upper portions 41, 42 of the shroud 40.

Moreover, since the lower portion 43 of each of the shrouds 40 extends downward from the upper portions 41, 42 and is coupled to the radiator 30, and the upper portions 41, 42 of the shroud 40 are arranged along the outer side wall face of the main frame 12, when stress is applied to the shroud 40 (for example, when external force is applied to a front end 44 of the shroud 40, or in a similar case), the upper portions 41, 42 of the shroud 40 abut on the outer side wall face of the main frame 12 and are restricted in position by the outer side wall face. For this reason, it is possible to favorably disperse the stress and thereby suppress the deformation of the shroud 40.

Moreover, in the exemplary embodiment the shrouds 40 are not fastened to the fuel tank 20, whereby it is unnecessary to provide the fuel tank 20 with any fastening portion for the shroud 40. Therefore, it is possible to reduce the manufacturing cost for the fuel tank 20 and to achieve a favorable maintenance workability involving removal of the fuel tank 20. In particular, when the fuel tank 20 is made of an expensive titanium material, for example, providing the fuel tank 20 with no fastening portion for the shrouds allows for significant reduction in the cost of the fuel tank 20.

The fuel tank 20 is provided with a tank cover 50 covering the fuel tank 20 from above. Lower sides 51 of the tank cover 50 are arranged along upper sides 12f of the main frames 12 in a side view. The shrouds 40 are arranged such that their upper portions 41, 42 are arranged along the corresponding lower side 51 of the tank cover 50 and also flush with the lower side 51 of the tank cover 50.

With this configuration, it is possible to favorably protect the faces of the outer side walls 12c of the main frames 12 by using the upper portions 41, 42 of the shroud 40. Also since the upper portions 41, 42 of the shrouds 40 and the lower sides 51 of the tank cover 50 are flush with each other, it is possible for the rider to favorably move his/her legs without being caught or otherwise restricted by any gap between the tank cover and the shrouds.

Furthermore, since the upper portions 41, 42 of the shrouds 40 are connected to the shroud fastening portions 12b, 12d which are spaced from each other along the main frames 12 which extend rearward and downward, and the lower the shrouds are restricted in position by the main frame 12 across an entire width W thereof relative to both longitudinal and vertical directions of the motorcycle, whereby it is possible for the shrouds 40 to receive bumps or other impacts with a wide area and to thus effectively disperse the stress for limiting deformation of the shrouds.

Note that in FIG. 1, a reference numeral 2 denotes a step on which the rider places his/her foot; 3 denotes a seat on which the rider sits down; and 4 denotes a handle to be steered by the rider. The handle 4 is rotatably supported on the head pipe 11, and is used to steer a front wheel WF supported on a lower end of a front fork.

The tank cover 50 and the fuel tank 20 are fastened and fixed to the vehicle-body frame 10 by being fastened together from above. In FIGS. 2A, 2B and 3, a reference numeral 13 denotes their fastening and fixing portion. With this configuration, it is possible to fasten and remove the tank cover 50 and the shrouds 40 separately, and to achieve a favorable maintainability because the work of removing the fuel tank 20 can be efficiently conducted from above.

A pair of left and right attachment pieces 52, 22 are provided on a rear portion of the tank cover 50 and a rear portion of the fuel tank 20, respectively. The rear portion of the tank cover 50 and the rear portion of the fuel tank 20 are fixed to the main frames 12 by being fastened together to fixing portions 13d (see FIGS. 4 and 5) of the main frame 12 by using bolts 13b with the attachment pieces 52, 22 being placed on each other. Front portions of the tank cover 50 and the tank cover 50 are also fixed to the vehicle-body frame 10 by being fastened together to a fixing portion 14d (see FIGS. 3-5) provided on a coupling portion 14 between the main frames 12 (L, R) with a bolt 14b, as an exemplary fastening member.

The shroud fastening portion provided on each of the main frames 12 includes the front fastening portion 12b and the rear fastening portion 12d which are provided in spaced relation on front and rear portions of each of the main frames, and the upper portions 41, 42 of each of the shrouds 40 are respectively fastened to the front fastening portion 12b and the rear fastening portion 12d by using the fastening members 40b. The lower portion 43 of each of the shrouds 40 is connected to the radiator 30. With this configuration, it is possible to additionally support the radiator 30 by using the shrouds 40, apart from support the radiator receives from being directly connected to the vehicle body frame 10.

Any structure may be employed for connecting the lower portion 43 of each of the shrouds 40 and the radiator 30 as appropriate. In this embodiment, the lower portion 43 of each shroud 40 is fixed to the radiator 30 by using the fastening member (bolt or the like) 43b.

Each of the shrouds 40 is fastened to the front fastening portion 12b, the rear fastening portion 12d, and the radiator 30 from the corresponding lateral side of the vehicle body. With this configuration, it is possible to achieve a favorable workability for removing the shrouds 40, and to thus achieve a favorable maintainability.

Each of the shrouds 40 includes a notch 45 located between the upper portions 41, 42 thereof, which are respectively fixed to the front fastening portion 12b and the rear fastening portion 12d provided on parts of the corresponding main frame which are spaced from each longitudinal and vertical directions of the motorcycle. The notch 45 is also located rearward of the radiator 30. With this configuration, since the front fastening portion 12b and the rear fastening portion 12d are not connected in a straight line extending longitudinally or vertically of the vehicle, it is possible to achieve a shape with which force acting on one of the upper portions 41, 42 is unlikely to affect the other upper portion. Further, location of the notch rearward of the radiator 30 causes a favorable flow of air to the outside at a position rearward of the radiator 30 and to thus achieve a favorable cooling efficiency of the radiator 30.

Note that in FIG. 1 and the other drawings, a reference numeral E denotes an engine supported on the vehicle-body frame 10; 5 denotes a swingarm supported on the vehicle-body frame 10 and supporting a rear wheel WR at a rear end thereof; 6 denotes a cushion unit provided between the swingarm 5 and the vehicle-body frame 10 with a link 7 in between. A reference numeral 9 denotes a rear side cover, and 8 denotes a side cover. A side face of the tank cover 50, the side cover 8, and the rear side cover 9 form smoothly connected side faces of the vehicle.

Although the exemplary embodiment of the present invention has been described herein. However, the present invention is not limited to the foregoing embodiment, but can be modified as appropriate within the scope and spirit of the present invention, as will be understood by persons of ordinary skill in the art and as reflected in the appended claims.

EXPLANATION OF THE REFERENCE NUMERALS

10: VEHICLE-BODY FRAME
11: HEAD PIPE
12: MAIN FRAME
12b, 12d: SHROUD FASTENING PORTION
12c: OUTER SIDE WALL (OUTER SIDE FACE)
12f: UPPER SIDE
20: FUEL TANK
30: RADIATOR
40: SHROUD
41, 42: UPPER PORTION
43: LOWER PORTION
45: NOTCH
50: TANK COVER
51: LOWER SIDE

We claim:
1. A radiator shroud structure for a saddle riding type vehicle having a vehicle-body frame including
 a head pipe and
 a pair of left and right main frames extending rearward and downward from the head pipe,
 a fuel tank supported by the vehicle-body frame between the left and right main frames, and
 a radiator supported below the left and right main frames, and
 a tank covering the fuel tank from above;

wherein the shroud structure comprises:
  radiator shrouds covering lateral sides of the radiator; and
  shroud fastening portions provided on outer side walls of the left and right main frames,
  wherein the shrouds are fastened and fixed to the respective shroud fastening portions provided on the outer side walls of the main frames, and upper portions of the shrouds are respectively arranged in covering relation along outer faces of the outer side walls of the main frames, and lower portions of the shrouds extend downward from the upper portions of the shrouds and are configured to be coupled to the radiator;
  wherein the lower sides of the tank cover are arranged along upper sides of the respective main frames in a side view, and
  wherein each of the shrouds is configured such that the upper portion of the shroud is arranged along a corresponding lower side of the tank cover so as to be flush therewith.

2. The radiator shroud structure according to claim 1, wherein in the saddle riding type vehicle the tank cover and the fuel tank are fastened and fixed to the vehicle-body frame by being fastened together from above, and wherein the shrouds are not connected to fuel tank or the tank cover.

3. The radiator shroud structure according to claim 2, wherein the shroud fastening portions respectively provided on the main frames each includes a front fastening portion and a rear fastening portion which are provided on front and rear portions of the corresponding main frame, respectively, the upper portion of each of the shrouds includes front and rear upper portions which are respectively fastened to the front fastening portion and the rear fastening portion provided on the corresponding main frame, and the lower portions of the shrouds are configured to be connected to the radiator such that they support the radiator.

4. The radiator shroud structure according to claim 2, wherein the upper portion of each of the shrouds is fastened to the fastening portion provided on the corresponding main frame from a lateral side of a vehicle body, and the lower portion of each of the shrouds is also connected to the radiator from the lateral side of a vehicle body.

5. The radiator shroud structure according to claim 1, wherein the shroud fastening portions respectively provided on the main frames each includes a front fastening portion and a rear fastening portion which are provided on front and rear portions of the corresponding main frame, respectively, the upper portion of each of the shrouds includes front and rear portions which are respectively fastened to the front fastening portion and the rear fastening portion provided on the corresponding main frame, and the lower portions of the shrouds are configured to be connected to the radiator such that they support the radiator.

6. The radiator shroud structure according to claim 5, wherein the front and rear upper portions of each of the shrouds are fastened to the front fastening portion and the rear fastening portion of the corresponding main frame from a lateral side of a vehicle body, and the lower portion of each of the shrouds is also connected to the radiator from a lateral side of a vehicle body.

7. The radiator shroud structure according to claim 6, wherein each of the shrouds includes an open notch located between the front and rear upper portions thereof, and the notch is also located rearward of the radiator when the shroud is connected to the saddle riding type vehicle.

8. The radiator shroud structure according to claim 5, wherein each of the shrouds includes an open notch located between the front and rear upper portions thereof, and the notch is also located rearward of the radiator when the shroud is connected to the saddle riding type vehicle.

9. The radiator shroud structure according to claim 1, wherein the upper portion of each of the shrouds is fastened to the fastening portion provided on the corresponding main frame from a lateral side of a vehicle body, and the lower portion of each of the shrouds is also connected to the radiator from the lateral side of a vehicle body.

10. A saddle riding type vehicle, comprising:
  a vehicle-body frame including a head pipe and a pair of left and right main frames extending rearward and downward from the head pipe;
  a fuel tank supported by the vehicle-body frame between the left and right main frames;
  a tank cover covering the fuel tank from above;
  a radiator supported below the left and right main frames; and
  a radiator shroud structure,
  wherein the shroud structure includes radiator shrouds covering lateral sides of the radiator, shroud fastening portions are provided on outer side walls of the left and right main frames, the shrouds are fastened and fixed to the respective shroud fastening portions provided on the outer side walls of the main frames, and upper portions of the shrouds are respectively arranged in covering relation along outer faces of the outer side walls of the main frames, and lower portions of the shrouds extend downward from the upper portions of the shrouds and are connected to the radiator; and
  wherein lower sides of the tank cover are arranged along upper sides of the respective main frames in a side view, and the upper portions of the shrouds are arranged along corresponding lower sides of the tank cover so as to be flush therewith.

11. The saddle riding type vehicle according to claim 10, wherein the tank cover and the fuel tank are fastened and fixed to the vehicle-body frame by being fastened together from above, and the shrouds are not connected to fuel tank or the tank cover.

12. The saddle riding type vehicle according to claim 11, wherein the shroud fastening portions respectively provided on the main frames each includes a front fastening portion and a rear fastening portion which are provided on front and rear portions of the corresponding main frame, respectively, the upper portion of each of the shrouds includes front and rear portions which are respectively fastened to the front fastening portion and the rear fastening portion provided on the corresponding main frame, and the lower portions of the shrouds are connected to the radiator such that they support the radiator.

13. The saddle riding type vehicle according to claim 10, wherein the shroud fastening portions respectively provided on the main frames each includes a front fastening portion and a rear fastening portion which are provided on front and rear portions of the corresponding main frame, respectively, the upper portion of each of the shrouds includes front and rear portions which are respectively fastened to the front fastening portion and the rear fastening portion provided on the corresponding main frame, and the lower portions of the shrouds are connected to the radiator such that they support the radiator.

14. The saddle riding type vehicle according to claim 13, wherein the front and rear upper portions of each of the shrouds are fastened to the front fastening portion and the rear fastening portion of the corresponding main frame from a lateral side of a vehicle body, and the lower portion of each of the shrouds is also connected to the radiator from a lateral side of a vehicle body.

15. The saddle riding type vehicle according to claim 14, wherein each of the shrouds includes an open notch located between the front and rear upper portions thereof, and the notch is also located rearward of the radiator.

16. The saddle riding type vehicle according to claim 10, wherein the upper portion of each of the shrouds is fastened to the fastening portion provided on the corresponding main frame from a lateral side of a vehicle body, and the lower portion of each of the shrouds is also connected to the radiator from the lateral side of a vehicle body.

* * * * *